April 6, 1954     A. L. HIGHBERG     2,674,090
COMBUSTION CHAMBER FOR GAS TURBINES
Filed March 21, 1950     4 Sheets-Sheet 1

April 6, 1954 A. L. HIGHBERG 2,674,090
COMBUSTION CHAMBER FOR GAS TURBINES
Filed March 21, 1950 4 Sheets-Sheet 2

Inventor
Axel L. Highberg
by Charles A. Warren
Attorney

April 6, 1954     A. L. HIGHBERG     2,674,090
COMBUSTION CHAMBER FOR GAS TURBINES
Filed March 21, 1950     4 Sheets-Sheet 3

April 6, 1954 A. L. HIGHBERG 2,674,090
COMBUSTION CHAMBER FOR GAS TURBINES
Filed March 21, 1950 4 Sheets-Sheet 4

Inventor
Axel L. Highberg
by Charles A. Warren
Attorney

Patented Apr. 6, 1954

2,674,090

UNITED STATES PATENT OFFICE 2,674,090

COMBUSTION CHAMBER FOR GAS TURBINES

Axel L. Highberg, West Hartford, Conn., assignor to United Aircraft Corporation, East Hartford, Conn., a corporation of Delaware Application March 21, 1950, Serial No. 150,973

4 Claims. (Cl. 60—39.36)

This invention relates to combustion chambers for gas turbine power plants.

As gas turbine power plants have increased in size and power the dimensions of combustion chambers have also necessarily increased proportionally to accommodate the greater flow of air through the power plant. The greater combustion chamber dimensions have involved an increase in both the length and the transverse dimensions of the combustion space which is located within the combustion chamber and within which the combustion of the fuel in the air takes place. The resultant increased length of the combustion chamber has frequently made the power plant excessively long and accordingly difficult to build and to mount adequately on a supporting structure especially in the aircraft type of gas turbine power plants. Therefore, attempts have been made to limit the length of the combustion chamber.

It has been found that best combustion occurs when the length of the combustion space within the combustion chamber is at least several times the diameter of the combustion space so that the length of the combustion chamber cannot be arbitrarily reduced without detrimentally affecting the combustion process. A feature of the present invention is an arrangement for providing combustion spaces with the most advantageous length-to-width ratio independently of the overall length-to-width ratio of the combustion chamber itself. Another feature is a combustion chamber which may be relatively short but which will still maintain approximate dimensions in the flame tubes.

The combustion chambers for these power plants, especially the power plants adapted for aircraft in which the compressor and turbine are usually mounted on concentric axes are basically of three types. One type has a combustion chamber comprised of a series of cans each enclosing a flame tube with the cans in a ring around the shaft which interconnects the compressor and turbine. Each can forms a separate duct extending from the discharge end of the compressor to the turbine inlet, a can of this type being shown, for example, in the Curtis patent No. 635,919.

Another type is the semi-annular type in which the combustion chamber is an annular duct between the compressor and the turbine and surrounding the interconnecting shaft and has therein a ring of angularly spaced flame tubes in which combustion of the fuel takes place. The third or annular type of combustion chamber has an annular duct extending between the compressor and turbine as in the semi-annular type but has a single flame tube extending concentrically to the annular duct and located therein.

In each of these types of combustion chambers it is still essential that the length-to-width ratio of the combustion space be maintained above a predetermined limit in order that proper combustion may take place within a predetermined length while at the same time maintaining a reasonably short combustion chamber. A feature of this invention is the provision, in any one of the three combustion chamber constructions, of shields which define, transversely of the duct, laterally spaced combustion spaces located in side-by-side relation with a central air inlet therebetween such that the actual transverse dimension of the combustion spaces defined by the shields is within the predetermined dimensional relation to the length of these spaces.

The tendency in many of these power plants is to provide for a straight-through flow of gas within the power plant. Thus with an axial flow compressor and an axial flow turbine the combustion chamber or chambers extend axially from the annular discharge opening of the compressor to the annular turbine inlet. In order to reduce the rate of flow of the gas through the combustion chamber such that the flame will not blow out and such that combustion will be completed before the gas reaches the turbine, the gas path through the combustion chamber is made wider to give a larger cross sectional area for the gas flow. The necessarily greater transverse dimension makes difficult adequate mixing of the injected fuel to assure complete burning within the chamber. A feature of the invention is an arrangement for maintaining a favorable length-to-width ratio of the flame tubes within the combustion chamber regardless of the overall length-to-width ratio of the chamber.

Other objects and advantages will be apparent from the specification and claims, and from the accompanying drawings which illustrate an embodiment of the invention.

Figure 1:
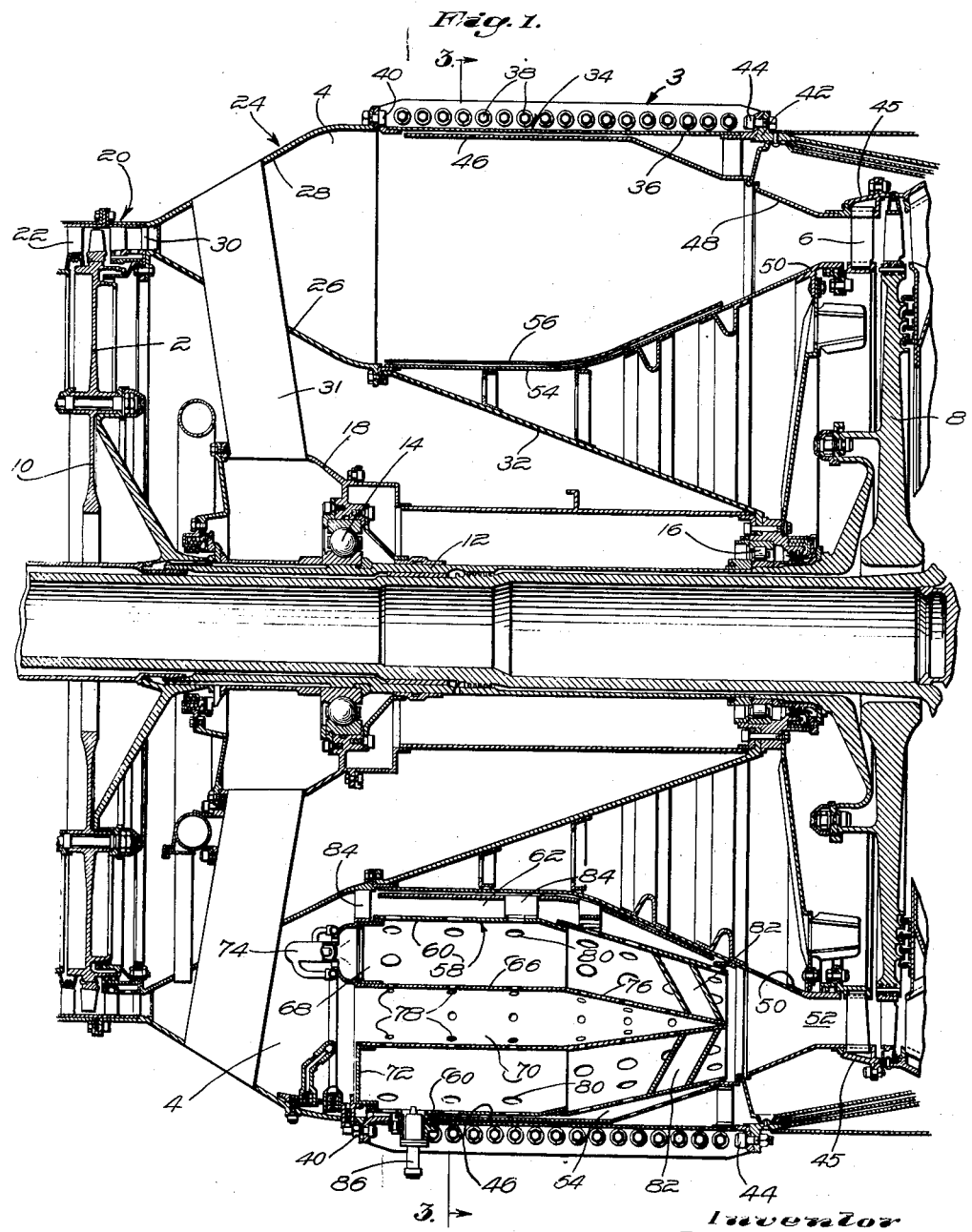
Fig. 1 is a longitudinal sectional view through a part of a gas turbine power plant showing the combustion chamber.

The invention is shown in connection with a gas turbine power plant in which the compressor 2, the last stage only of which is shown, delivers air under pressure to a combustion chamber 3 comprising an annular duct 4 in which fuel is mixed with the air and burned to produce power gases which are then discharged through a turbine nozzle 6 for driving the turbine rotor 8. The rotor 8, only a part of which is shown, is connected to the compressor rotor 10 by a sleeve 12 which may be supported in spaced bearings 14 and 16 within the supporting structure 18.

The compressor casing 20 which carries stationary vanes 22 has attached thereto at its downstream end the diffuser section 24 of the combustion chamber. This diffuser section consists of diverging inner and outer walls 26 and 28 which, adjacent their upstream ends are spaced apart and parallel and are interconnected by straightening vanes 30. These walls diverge in a downstream direction and form with the compressor casing 20 a part of the load carrying structure of the power plant. The supporting structure 18 for the bearings 14 and 16 is carried by radially extending members 31 welded or otherwise attached to the diffuser section and an additional supporting element 32 extends from the downstream end of the inner wall 26 to the supporting structure 18 adjacent the bearing 16.

The central part of the combustion chamber downstream of the diffuser section is enclosed within an outer cylindrical wall 34 which, in the arrangement shown, is made up of cylinder segments 36 to provide access to the flame tubes of the combustion chamber as will hereinafter appear. The separate segments 36 are held together as by rows of bolts 38. The upstream ends of the segments 36 are bolted to the end of the outer wall 28 of the diffuser section as by bolts 40 and the downstream ends of the segments engage with a supporting ring 42 being held as by bolts 44. The interengaging surfaces on the ring 42 and on the segments extend at an oblique angle to the longitudinal axis of the power plant to provide easier assembly and disassembly and to assure a tight fit when the parts are assembled.

The ring 42 is frusto-conical and at its smaller downstream end engages with and supports the turbine casing 45 which carries the nozzles 6.

Within the segments 36 and supported thereby in closely spaced relation is an annular heat shield 46 which may also be made up in segments and which, in effect, forms the outer wall of the duct 4. The shield 46 becomes smaller in diameter at its downstream end to align substantially with an outer wall 48 which, in conjunction with an inner wall 50, defines the inlet passage 52 to the turbine nozzles 6, this passage being a continuation of the duct 4.

From the downstream end of the inner wall 26 of the diffuser section, the inner wall of the annular duct 4 is defined by a sleeve 54, the upstream end of which is connected as by bolts to the end of wall 26. The upper portion of the sleeve is cylindrical and is thus parallel to the wall 34 and the sleeve then becomes gradually larger in diameter to cause the sleeve, and thus the inner wall of duct 4 to converge toward the outer wall 34. The downstream end of sleeve 54 is a sliding fit with the upstream end of wall 50. Sleeve 54 is shielded from the heat within the combustion chamber by a liner 56 closely spaced from and on the outside of the sleeve 54. The annular duct 4 thus includes the diffuser section in which the inner and outer walls diverge, the substantially cylindrical section in which the combustion takes place, and the section of gradually decreasing cross sectional area for guiding the hot power fluid to the turbine nozzle.

The combustion chamber as shown has a relatively low length-to-width ratio. It has been found that adequate mixing of the fuel and air for combustion will not readily take place within the length of the combustion chamber where the width is relatively large and the combustion chamber is accordingly divided in its transverse dimension by placing flame tubes defining combustion spaces in side-by-side relation transversely of the combustion chamber. As will more clearly appear hereinafter the individual spaces have a relatively high length-to-width ratio such that adequate mixing takes place and the combustion is completed before the mixture of fuel and air reaches the inlet to the turbine.

Figure 2:
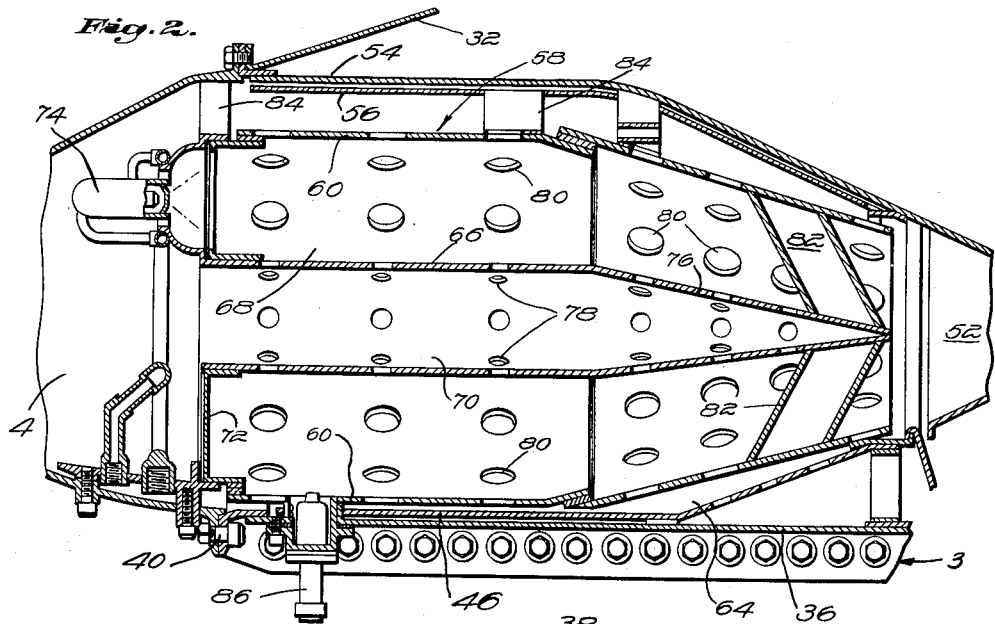
Fig. 2 is an enlarged view of the central section of the combustion chamber.
Figure 3:
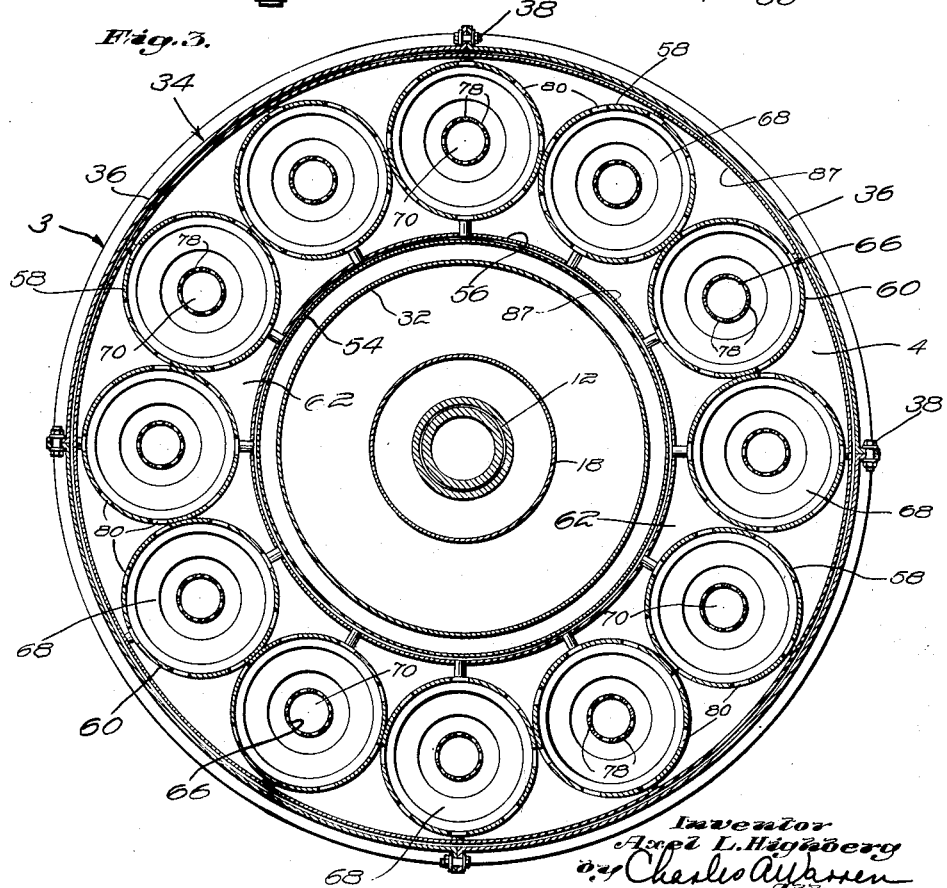
Fig. 3 is a transverse sectional view through a part of the combustion chamber on line 3—3 of Fig. 1.

The invention is shown in Figs. 1–3 in the semi-annular or can-annular construction in which the combustion chamber duct 4 is annular and concentric to the shaft which connects the turbine and compressor whereas the flame tubes 58 are in the form of individual cylinders located in a ring around the shaft and positioned within the annular duct. As best shown in Figs. 1 and 3, the flame tube comprises an outer shield 60 which is of a diameter somewhat smaller than the transverse dimension of the combustion chamber to provide a space 62 between the shield 60 and the inner wall 54 of the combustion chamber and a space 64 between the shield and the outer wall 34 of the combustion chamber. An inner shield 66 is positioned inside of the outer shield 60 in spaced relation thereto and together the shields define an annular combustion space 68 in which combustion takes place. It will be apparent that the length-to-width ratio of the combustion space is much larger than that of the combustion chamber itself and is within the required limits for proper combustion to take place within the confines of the combustion space. The inner shield 66 defines a centrally located air path 70 between diametrically opposed parts of the combustion space.

The upstream end of combustion space 68 is closed by a wall 72 which has positioned therein a plurality of fuel injection nozzles 74. These nozzles are spaced circumferentially around the closure wall and provide for the injection of fuel at a number of circumferentially spaced points at the upstream end of the combustion space. The downstream end of the inner shield 66 is closed by the conical element 76, the shield having perforations 78 therein through which air enters the combustion space. Similarly the outer shield 60 has perforations 80 therein for the admission to the combustion space of air flowing externally around the outer shield. The number of perforations 80 and the areas thereof are made adequate for the purpose of admitting substantially all of the primary and secondary air. The relatively small transverse spacing of the inner and outer shields assures penetration of the air to the center of the combustion space and thus assures more satisfactory combustion.

The inner and outer shields are properly spaced at their upstream ends by the closure walls 72 and may be supported at their downstream ends by struts 82. The outer shield is held in predetermined relation to the walls of the combustion chamber by suitable spacers 84. A spark plug igniter 86 may extend into the combustion space for ignition of the mixture of fuel and air in starting the power plant.

Air enters annular duct 4 in the combustion chamber through annular diffuser section 24. This air, as best can be seen in Figs. 2 and 3, flows completely around each of the cans 58 as well as into the space within shield 66. Primary air enters the annular combustion space 68 around each of the fuel injection nozzles 74 and additional air for combustion purposes is admitted to the combustion space through holes 78 in shield 66 and holes 80 in shield 60. These holes are arranged along the length of shields 60 and 66 so that air is continuously admitted to the combustion space both for maintaining combustion and for cooling the combustion gases. The gases are discharged from the combustion chamber into passage 52 from where they pass through turbine nozzles 6 and turbine rotor 8.

Figure 4:
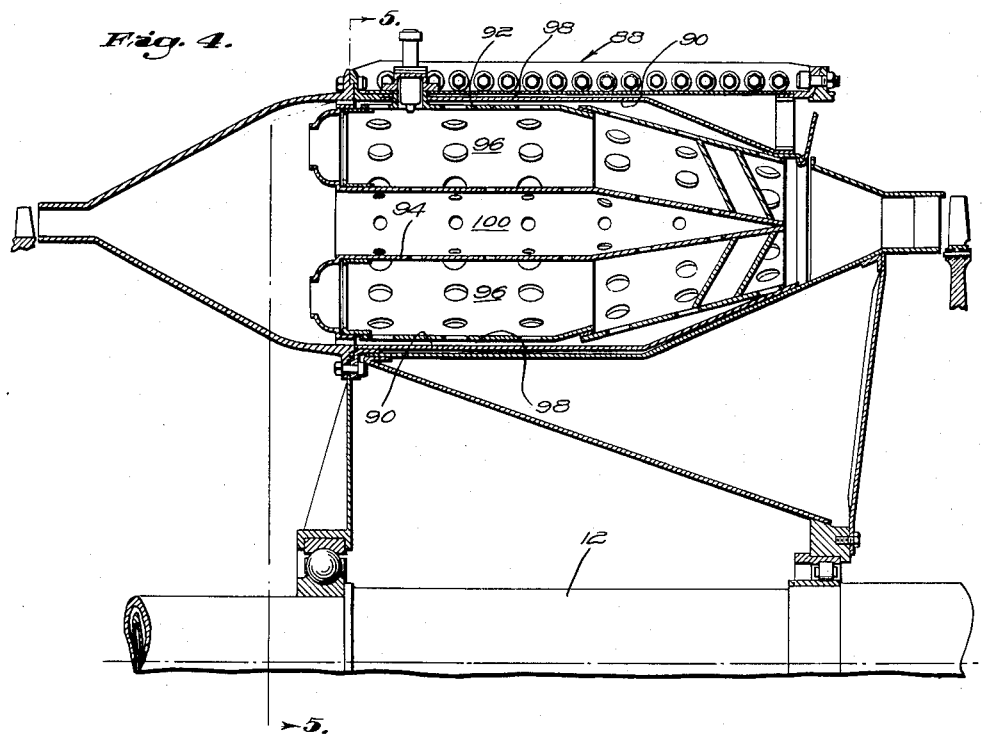
Fig. 4 is a longitudinal sectional view similar to Fig. 2 showing a modification.
Figure 5:
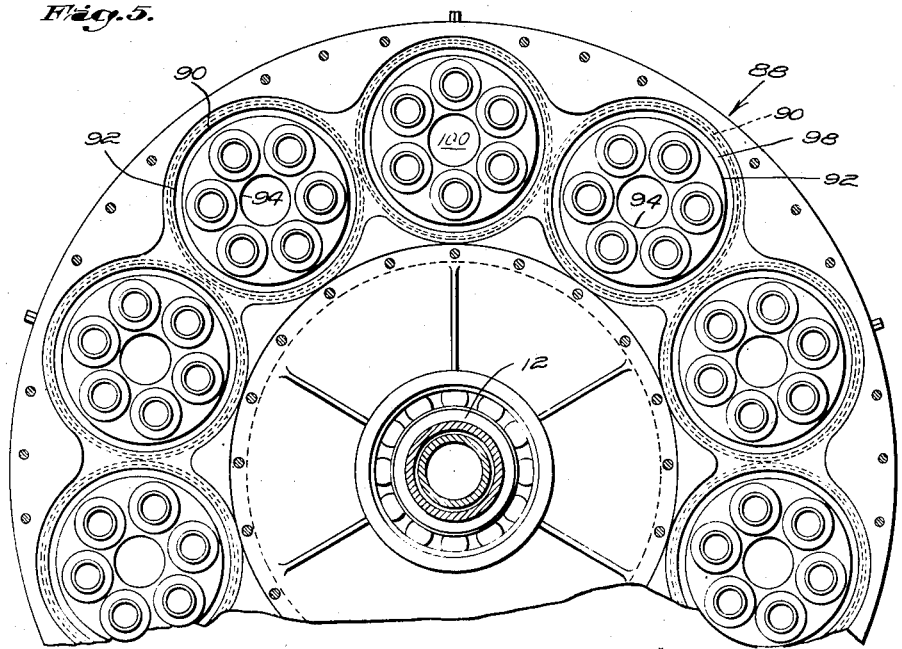
Fig. 5 is a transverse sectional view on the line 5—5 of Fig. 4.

The invention is equally applicable to the can type of combustion chamber as shown in Figs. 4 and 5 in which the combustion chamber 88 is made up of a plurality of separate cans 90 arranged in a ring around the axis of the shaft 12 which connects the compressor and turbine, the ring of cans being normally concentric to the shaft and the cans being uniformly spaced apart. This construction omits the annular duct 4 which is characteristic of the semiannular construction described above and in which flame tubes 58 are located. Each can 90 has therein a structure comparable to flame tubes 58 above described including outer shield 92 and inner shield 94 to define, transversely of the can 90, laterally spaced combustion spaces 96 in side-by-side relation with an air space 98 between the outer shield and the walls of the duct and a centrally located air space 100 between the combustion spaces 96. The construction is similar to that above described in connection with Figs. 1–3, inclusive, and need not be further described in detail.

In this type of construction the compressor air is discharged directly into each combustion can 90, there being no annular duct receiving the air and in which the flame tubes are mounted as in the above described semiannular construction. The air is admitted to combustion spaces 96 through openings surrounding the fuel injection nozzles, not shown, on the upstream end of the shields, as well as through the openings in shields 92 and 94. The gases are discharged from each can to pass through the turbine rotor.

Figure 6:
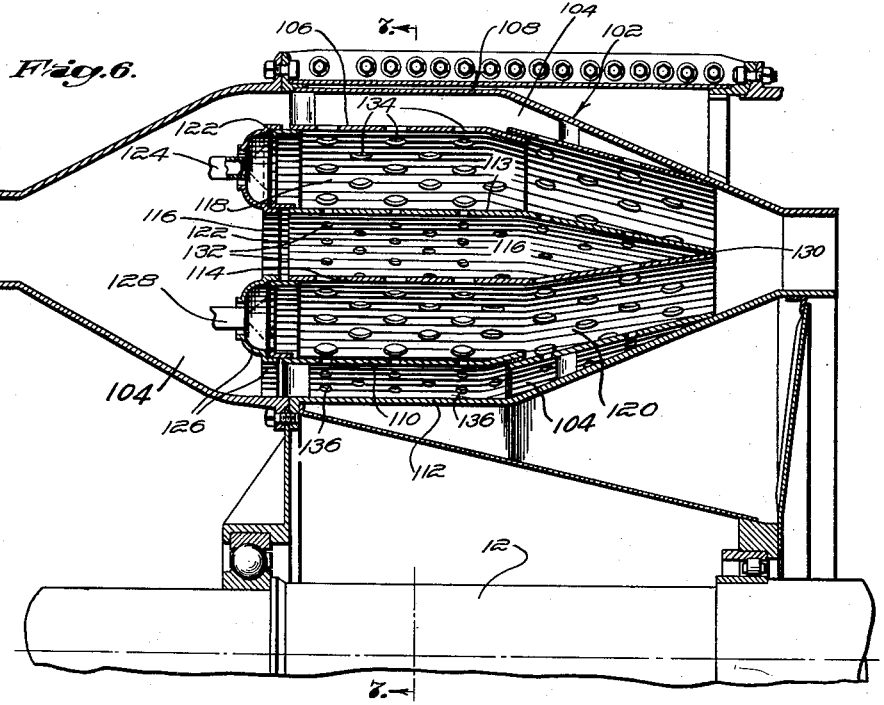
Fig. 6 is a longitudinal sectional view showing another modification.
Figure 7:
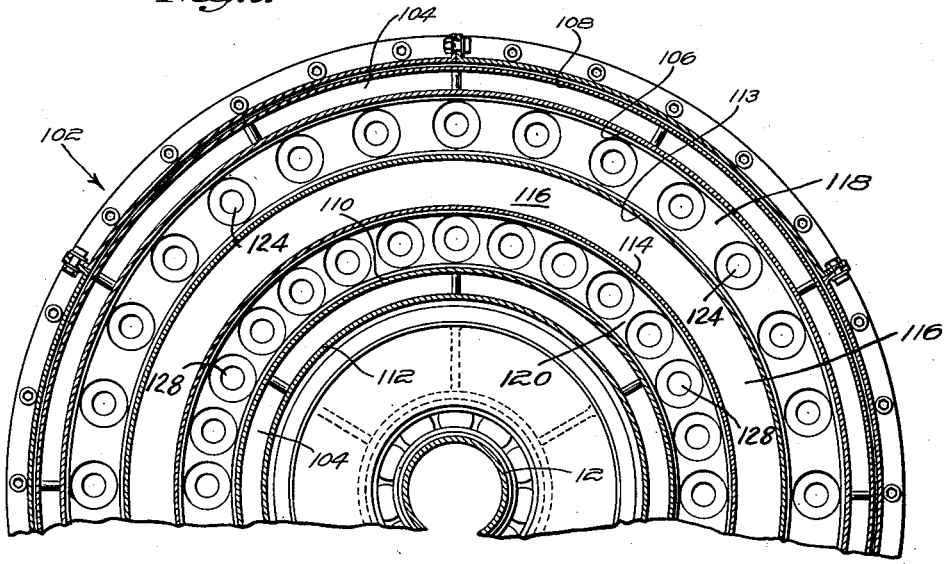
Fig. 7 is a transverse sectional view on the line 7—7 of Fig. 6.

The invention is also shown in Figs. 6 and 7 in the annular type of combustion chamber in which the combustion chamber 102 is comparable to the combustion chamber of Figs. 1–3 inclusive, and defines an annular duct 104 concentric to the axis of the shaft 12 which connects the compressor and turbine. Instead of the individual cans as described above, the annular duct has large diameter shields therein including an outer shield 106 spaced inwardly from and substantially parallel to outer wall 108 of the duct and a similar shield 110 slightly larger in diameter than the inner wall 112 of the duct to be spaced therefrom and in concentric relation thereto.

Between the shields 106 and 110 are additional spaced shields 113 and 114 also concentric to the shields 106 and 110 and defining therebetween a centrally located annular air passage 116 with a combustion space 118 between the shields 106 and 113 and another combustion space 120 between the shields 110 and 114.

The combustion space 118 between the two outermost shields 106 and 113 is closed at the upstream end by an annular cap 122 which has a large number of fuel nozzles 124 positioned therein for injecting fuel into the combustion space. Similarly, the upstream end of the combustion space between the inner shields 110 and 114 is closed by an annular cap 126 supporting a plurality of fuel nozzles 128. The two shields 113 and 114 are connected together at their downstream end by a closure 130 so that all of the air in the central air duct 116 must enter the combustion spaces through openings 132 in the shields. The shields 106 and 110 are also perforated as at 134 and 136, respectively, for the admission of air from the air spaces between these shields and the walls of the duct into the combustion spaces. The downstream ends of the outer air ducts are substantially closed, as shown, in such a manner that the greater portion of the air is caused to flow into the combustion spaces to mix with the products of combustion therein upstream of the turbine nozzle.

It will accordingly be apparent that in the three combustion chamber constructions above described the shields are so positioned that in any one of the constructions the shields define, transversely of the duct laterally spaced combustion spaces in side-by-side relation, a central air passage between the laterally spaced spaces, and other air passages outwardly of the combustion spaces and located between these spaces and the walls of the duct.

It is to be understood that the invention is not limited to the specific embodiment herein illustrated and described, but may be used in other ways without departure from its spirit as defined by the following claims.

I claim:

1. In a combustion chamber construction for a gas turbine power plant having a compressor and turbine and a combustion chamber duct connecting the compressor discharge to the turbine inlet, said duct being in the form of an annulus surrounding and substantially concentric to the axis of the turbine, said duct having mounted therein a ring of flame tubes, each flame tube comprising a plurality of concentric shields located one within the other to define between the inner and outer walls of the duct spaced combustion chambers in side-by-side relation, one of said shields defining an air inlet passage between the laterally spaced combustion chambers and another of said shields defining air inlet passages between the chambers and the inner and outer walls of the duct, the effective length-to-width ratio of the combustion chambers being relatively high.

2. In a combustion chamber construction for a gas turbine power plant having a compressor and turbine and a combustion chamber duct connecting the compressor discharge to the turbine inlet, said duct being in the form of an annulus surrounding and substantially concentric to the axis of the turbine, said duct having mounted therein a ring of flame tubes, each flame tube comprising a plurality of concentric shields located one within the other to define between the inner and outer walls of the duct spaced combustion chambers in side-by-side relation, one of said shields defining an air inlet passage between the laterally spaced combustion chambers and another of said shields defining air inlet passages between the chambers and the inner and outer walls of the duct, the effective length-to-width ratio of the combustion chambers being relatively high, said shields having means for substantially closing the upstream ends of the spaced combustion chambers, and means for introducing fuel through said closure means into the spaced combustion chambers.

3. In a combustion chamber construction for a gas turbine power plant having a compressor and turbine on the same axis, a duct connecting the compressor discharge to the turbine inlet, said duct having inner and outer walls defining an annulus surrounding and substantially concentric to the turbine axis, said duct having mounted therein a plurality of combustion chambers, each of said chambers comprising inner and outer concentric shields with the outer shield spaced from the walls of the duct and the inner shield spaced from and within the outer shield to define therebetween an annular combustion space, an air passage within and defined by the inner shield, the effective length-to-width ratio of the combustion chambers being relatively large.

4. In a combustion chamber construction for a gas turbine power plant having a compressor and turbine on the same axis, a duct connecting the compressor discharge to the turbine inlet, said duct having inner and outer walls defining an annulus surrounding and substantially concentric to the turbine axis, said duct having mounted therein a plurality of circumferentially spaced combustion chambers, each of said chambers comprising inner and outer concentric shields with the outer shield spaced from the inner and outer walls of the duct and the inner shield spaced from and within the outer shield to define therebetween an annular combustion space of relatively large length-to-width ratio, an air passage within and defined by the inner shield, an annular closure substantially closing the upstream end of said combustion space and extending between said inner and outer shields, and fuel injection means mounted in said closure for delivering fuel into the upstream end of the combustion space.

References Cited in the file of this patent

UNITED STATES PATENTS

| Number | Name | Date |
|---|---|---|
| 2,410,450 | Kroon | Nov. 5, 1946 |
| 2,422,213 | Smith | June 17, 1947 |
| 2,439,273 | Silvester | Apr. 6, 1948 |
| 2,447,482 | Arnold | Aug. 24, 1948 |
| 2,477,583 | De Zubay et al. | Aug. 2, 1949 |
| 2,552,851 | Gist | May 15, 1951 |

FOREIGN PATENTS

| Number | Country | Date |
|---|---|---|
| 620,270 | Great Britain | Mar. 23, 1939 |